(12) United States Patent
Lee (10) Patent No.: US 12,481,472 B2
(45) Date of Patent: Nov. 25, 2025

(54) COLLABORATION SYSTEM AND COLLABORATION METHOD

(71) Applicant: Optoma Corporation, New Taipei (TW)

(72) Inventor: Wen Lee, New Taipei (TW)

(73) Assignee: Optoma Corporation, New Taipei (TW)

( * ) Notice: Subject to any disclaimer, the term of this patent is extended or adjusted under 35 U.S.C. 154(b) by 0 days.

(21) Appl. No.: 18/814,563

(22) Filed: Aug. 25, 2024

(65) Prior Publication Data

US 2025/0077162 A1    Mar. 6, 2025

(30) Foreign Application Priority Data

Sep. 4, 2023   (TW) .................................. 112133424

(51) Int. Cl.
*G06F 3/14* (2006.01)
(52) U.S. Cl.
CPC ................. *G06F 3/1454* (2013.01)
(58) Field of Classification Search
CPC ............ G06F 3/1454; G06F 9/452; G06F 2203/04806; G06F 3/0485; G09G 5/38; G09G 2340/0464; G09G 2354/00; G09G 5/08; G09G 5/14
See application file for complete search history.

(56) References Cited

U.S. PATENT DOCUMENTS

| | | |
|---|---|---|
| 2002/0083098 A1 | 6/2002 | Nakamura |
| 2002/0120547 A1 | 8/2002 | Zajac |
| 2016/0232646 A1 * | 8/2016 | Carlos ................... G06F 3/0485 |
| 2021/0004197 A1 | 1/2021 | Santhakumar et al. |
| 2025/0004687 A1 * | 1/2025 | Zhao ..................... G06F 3/0481 |

FOREIGN PATENT DOCUMENTS

| | | |
|---|---|---|
| CN | 103064602 | 4/2013 |
| CN | 109901938 | 11/2021 |
| CN | 115269715 | 11/2022 |
| TW | 200841268 | 10/2008 |
| TW | 202218404 | 5/2022 |

OTHER PUBLICATIONS

"Share slides in Microsoft Teams meetings with PowerPoint Live—Microsoft Support", Aug. 126, 2023, Available at: https://web.archive.org/web/20230816161433/https://support.microsoft.com/en-us/office/share-slides-in-microsoft-teams-meetings-with-powerpoint-live-fc5a5394-2159-419c-bc59-1f64c1f4e470, pp. 1-10.
"Search Report of Europe Counterpart Application", issued on Feb. 3, 2025, pp. 1-15.

* cited by examiner

*Primary Examiner* — Nelson M Rosario
(74) *Attorney, Agent, or Firm* — JCIPRNET (57) ABSTRACT

A collaboration system and a collaboration method are provided. The collaboration system includes a first display device and a second display device. The first display device includes a first screen. The first screen displays a first display interface. The first display interface has a first display window and a first function key. The first display window displays a first frame. The second display device includes a second display screen. The second display screen displays a second display interface. The second display interface has a second display window. The second display window displays a second frame. When the first function key is turned on, the first frame moves along with the second frame. When the first function key is turned off, the first frame does not follow the movement of the second frame.

20 Claims, 8 Drawing Sheets

COLLABORATION SYSTEM AND COLLABORATION METHOD

CROSS-REFERENCE TO RELATED APPLICATION

This application claims the priority benefit of Taiwan application serial no. 112133424, filed on Sep. 4, 2023. The entirety of the above-mentioned patent application is hereby incorporated by reference herein and made a part of this specification.

BACKGROUND

Technical Field

The disclosure relates to a system and a system operation method, and particularly relates to a collaboration system and a collaboration method applied to the collaboration system.

Description of Related Art

Conventional collaboration platforms generally cannot achieve an effect of effective screen synchronization display. In particular, when collaborating on different display devices with different resolutions and/or screen sizes, differences in display effects and/or display ranges may occur due to differences in resolutions and/or screen sizes, resulting in users being unable to see complete display content.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a collaboration system and a collaboration method, which achieve a collaborative function of synchronous screen display.

Additional aspects and advantages of the disclosure is set forth in the description of the techniques disclosed.

In order to achieve one or a portion of or all of the objects or other objects, an embodiment of the disclosure provides a collaboration system including a first display device and a second display device. The first display device includes a first communication device and a first screen. The second display device includes a second communication device and a second screen. The first communication device is used for wirelessly connecting with internet. The first screen is configured to display a first display interface. The first display interface comprises a first display window and a first function key. The first display window is configured to display a first frame. The second communication device is used for wirelessly connecting with the internet. The second screen is configured to display a second display interface. The second display interface comprises a second display window. The second display window is configured to display a second frame. When the first function key is turned on, the first frame displayed on the first display window moves along with the second frame displayed on the second display window. When the first function key is turned off, the first frame displayed on the first display window does not follow the movement of the second frame displayed on the second display window.

In an embodiment of the disclosure, the first display device further includes a first processor. The first processor is electrically connected to the first communication device and the first screen, and is configured to receive first event data sent by the second display device when the first function key is turned on. The first processor determines whether a frame range of the first frame is the same as a frame range of the second frame according to the first event data, so as to determine to make the first frame move along with the second frame, and to make the first frame scale the frame range of the first frame to be consistent with the frame range of the second frame.

In an embodiment of the disclosure, the first processor determines whether the frame range of the first frame is the same as the frame range of the second frame according to whether a difference between a frame center position of the first frame and a frame center position of the second frame exceeds a predetermined distance threshold, and according to whether a difference between a frame visual size of the first frame and a frame visual size of the second frame exceeds a predetermined area threshold.

In an embodiment of the disclosure, when the first processor determines that the frame range of the first frame is not the same as the frame range of the second frame, the first processor calculates and generates a distance that needs to move and a frame range that needs to be adjusted for the first frame.

In an embodiment of the disclosure, the collaboration system further includes a server. The server is communicatively connected to the first display device and the second display device. When the first function key is turned on, the first processor notifies the server to obtain the first event data.

In an embodiment of the disclosure, the second display device further includes a second processor. The second processor is electrically connected to the second communication device and the second screen, and is configured to send the first event data to the server, so as to send the first event data to the first display device through the server.

In an embodiment of the disclosure, the first event data includes frame center position data and frame visual size data of the second frame.

In an embodiment of the disclosure, when the first function key is turned on, a virtual mouse in the first display window moves along with a second mouse in the second display window.

In an embodiment of the disclosure, when the first function key is turned on, the second processor determines whether the second mouse moves every a predetermined period to send second event data to the server, so as to send the second event data to the first display device through the server.

In an embodiment of the disclosure, the second event data includes position data of the second mouse. The first processor displays a virtual mouse corresponding to the second mouse in the first display window according to the position data of the second mouse.

In order to achieve one or a portion of or all of the objects or other objects, an embodiment of the disclosure provides a collaboration method including following steps: displaying a first display interface through a first screen of a first display device, wherein the first display interface comprises a first display window and a first function key, and the first display window is configured to display a first frame;

displaying a second display interface through a second screen of a second display device, wherein the second display interface comprises a second display window, and the second display window is configured to display a second frame; when the first function key is turned on, making the first frame displayed on the first display window move along with the second frame displayed on the second display window; and when the first function key is turned off, making the first frame displayed on the first display window not follow the movement of the second frame displayed on the second display window.

In an embodiment of the disclosure, the step of making the first frame displayed on the first display window move along with the second frame displayed on the second display window includes: receiving first event data sent by the second display device through the first display device when the first function key is turned on; and determining whether a frame range of the first frame is the same as a frame range of the second frame by the first display device according to the first event data, so as to determine to make the first frame move along with the second frame, and to make the first frame scale the frame range of the first frame to be consistent with the frame range of the second frame.

In an embodiment of the disclosure, the step of determining whether the frame range of the first frame is the same as the frame range of the second frame includes: determining whether the frame range of the first frame is the same as the frame range of the second frame by the first display device according to whether a difference between a frame center position of the first frame and a frame center position of the second frame exceeds a predetermined distance threshold, and according to whether a difference between a frame visual size of the first frame and a frame visual size of the second frame exceeds a predetermined area threshold.

In an embodiment of the disclosure, the step of making the first frame move along with the second frame includes: when the first display device determines that the frame range of the first frame is not the same as the frame range of the second frame, calculating and generating a distance that needs to move and a frame range that needs to be adjusted for the first frame by the first display device.

In an embodiment of the disclosure, the collaboration method further includes: when the first function key is turned on, notifying a server by the first display device to obtain the first event data.

In an embodiment of the disclosure, the collaboration method further includes: sending the first event data to the server by the second display device, so as to send the first event data to the first display device through the server.

In an embodiment of the disclosure, the first event data includes frame center position data and frame visual size data of the second frame.

In an embodiment of the disclosure, the collaboration method further includes: when the first function key is turned on, making a virtual mouse in the first display window move along with a second mouse in the second display window.

In an embodiment of the disclosure, the step of making the virtual mouse in the first display window move along with the second mouse in the second display window comprises: when the first function key is turned on, determining whether the second mouse moves every a predetermined period by the second display device to send second event data to the server, so as to send the second event data to the first display device through the server.

In an embodiment of the disclosure, the second event data includes position data of the second mouse, and the step of making the virtual mouse in the first display window move along with the second mouse in the second display window further comprises: displaying a virtual mouse corresponding to the second mouse in the first display window by the first display device according to the position data of the second mouse.

Based on the above description, in the collaboration system and collaboration method of the disclosure, when the first function key in the first display window displayed by the display interface of the first display device is turned on, the first frame displayed on the first display window may automatically follow the second frame in the second display window displayed by the second display interface of the second display device to move and/or to scale.

To make the aforementioned more comprehensible, several embodiments accompanied with drawings are described in detail as follows.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
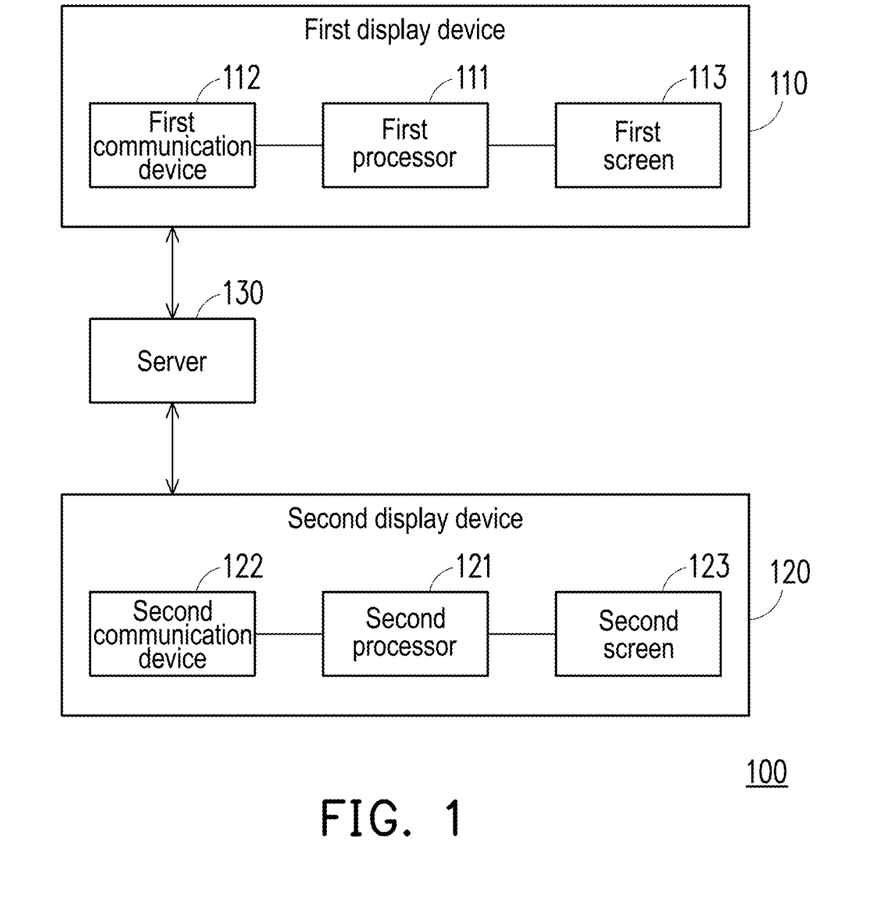
FIG. 1 is a schematic diagram of a collaboration system according to an embodiment of the disclosure.

FIG. 1 is a schematic diagram of a collaboration system according to an embodiment of the disclosure. Referring to FIG. 1, a collaboration system 100 includes a first display device 110, a second display device 120 and a server 130.

The first display device 110 includes a first processor 111, a first communication device 112 and a first screen 113. The first processor 111 is electrically connected to the first communication device 112 and the first screen 113. The second display device 120 includes a second processor 121, a second communication device 122 and a second screen 123. The second processor 121 is electrically connected to the second communication device 122 and the second screen 123. In the embodiment, the first communication device 112 and the second communication device 122 respectively wirelessly connects with the internet. The first display device 110 is wirelessly connected to the server 130 through the first communication device 112, and the second display device 120 is wirelessly connected to the server 130 through the second communication device 122. In the embodiment, the collaboration system 100 may be used to implement a collaborative editing platform on the Internet, for example, including a remote electronic whiteboard function.

In the embodiment, the first processor 111 and the second processor 121 may include, for example, a central processing unit (CPU), a graphics processor (GPU), or other programmable general-purpose or special-purpose microprocessors, digital signal processors (DSP), programmable controllers, application specific integrated circuits (ASICs), programmable logic devices (PLD), other similar processing devices, or a combination of these devices.

In the embodiment, the first communication device 112 and the second communication device 122 may respectively include a wired and/or wireless communication interface and a communication path, and may, for example, adopt a transmission control protocol/Internet protocol (TCP/IP) or a WebSocket protocol to create connections and communicate.

In the embodiment, the first screen 113 and the second screen 123 are used to display images. The first screen 113 and the second screen 123 may be respectively liquid crystal panel, light emitting diode panel (LED panel), organic light emitting diode panel (OLED panel), etc., but the disclosure is not limited thereto.

In the embodiment, the first display device 110 and the second display device 120 may further respectively include a storage unit (for example, a dynamic random access memory (DRAM), a flash memory, or a non-volatile random access memory (NVRAM), etc.) to at least store relevant algorithms and programs for executing the collaboration system of the disclosure. In the embodiment, the server 130 may also include the above-mentioned processor, storage unit and communication device. In the embodiment, the first display device 110 and the second display device 120 may be respectively an electronic whiteboard, an interactive flat panel (IFP), a smart phone, a tablet computer, a notebook computer, or a desktop computer or a projector device, etc., which is not limited by the disclosure.

Figure 2:
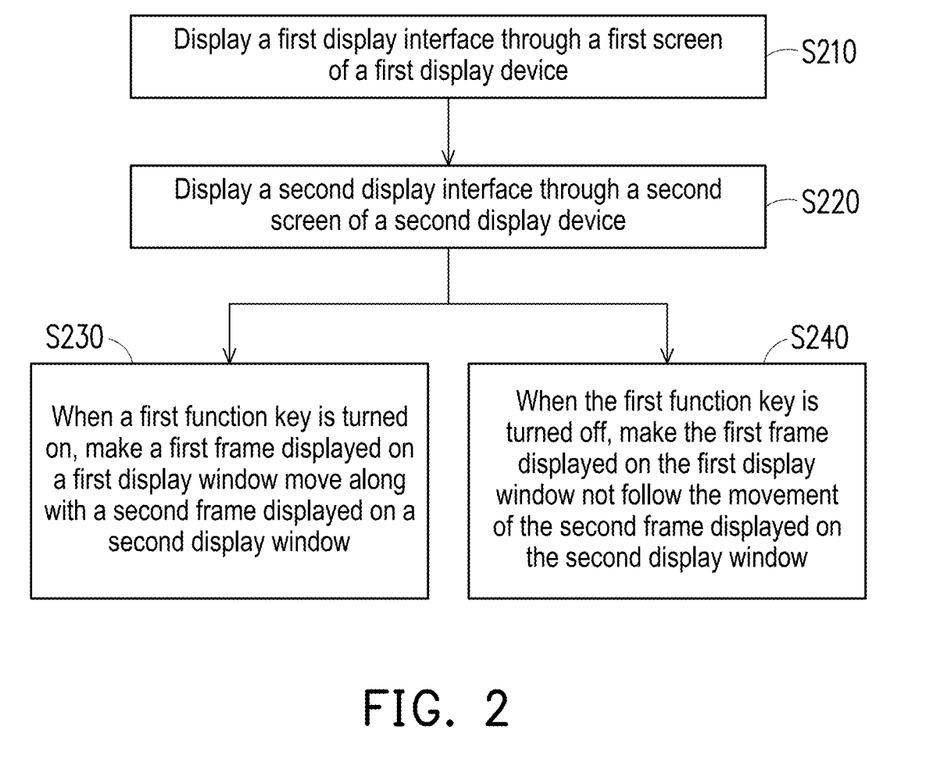
FIG. 2 is a flowchart of a collaboration method according to an embodiment of the disclosure.

FIG. 2 is a flowchart of a collaboration method according to an embodiment of the disclosure. Referring to FIG. 1 and FIG. 2, the collaboration system 100 may perform the following steps S210 to S240. In step S210, the first screen 113 of the first display device 110 may display a first display interface. To further explain, the first processor 111 executes a program of the first display device 110 so that the first screen 113 displays the first display interface. In the embodiment, the first display interface may have a first display window and a first function key, and the first display window is configured to display a first frame. In step S220, the second screen 123 of the second display device 120 displays the second display interface. To further illustrate, the second processor 121 executes a program of the second display device 120 so that the second screen 123 displays the second display interface. In the embodiment, the second display interface may have a second display window and a second function key, and the second display window may be used to display a second frame.

In step S230, when the first function key in the first display interface displayed by the first display device 110 is turned on, the first frame in the first display window moves along with the second frame displayed on the second display window in the second display interface displayed by the second display device 120. Alternatively, in step S240, when the first function key in the first display interface displayed by the first display device 110 is turned off, the first frame in the first display window does not follow the movement of the second frame displayed on the second display window in the second display interface displayed by the second display device 120. Therefore, the first display device 110 of the embodiment automatically switches the first frame to follow or not to follow the movement of the second frame according to whether the user turns on the first function key. The specific implementations of whether the first frame follows or does not follow the movement of the second frame will be further described in the following embodiments.

It should be noted that, in an embodiment, taking the second display interface displayed by the second display device 120 as an example, the second display interface further includes a stop function key. When the first function key in the first display interface displayed by the first display device 110 is turned on, and the stop function key in the second display interface of the second display device 120 is turned on, it means that the second display device 120 stops or refuses to allow the first frame in the first display window displayed by the first display device 110 to move along with the second frame displayed on the second display window in the second display interface displayed by the second display device 120.

In another embodiment, in the case that the first frame in the first display window displayed by the first display device 110 moves along with the second frame displayed on the second display window in the second display interface displayed by the second display device 120, when the first frame is operated (i.e., the user using the first display device 110 operates the first frame through a mouse or a touch panel), it is stopped or refused to allow the first frame in the first display window displayed by the first display device 110 to move along with the second frame displayed on the second display window in the second display interface displayed by the second display device 120.

In an embodiment, the first display interface displayed on the first screen 113 of the first display device 110 and the second display interface displayed on the second screen 123 of the second display device 120 are the same display interface and have the same function.

Figure 3:
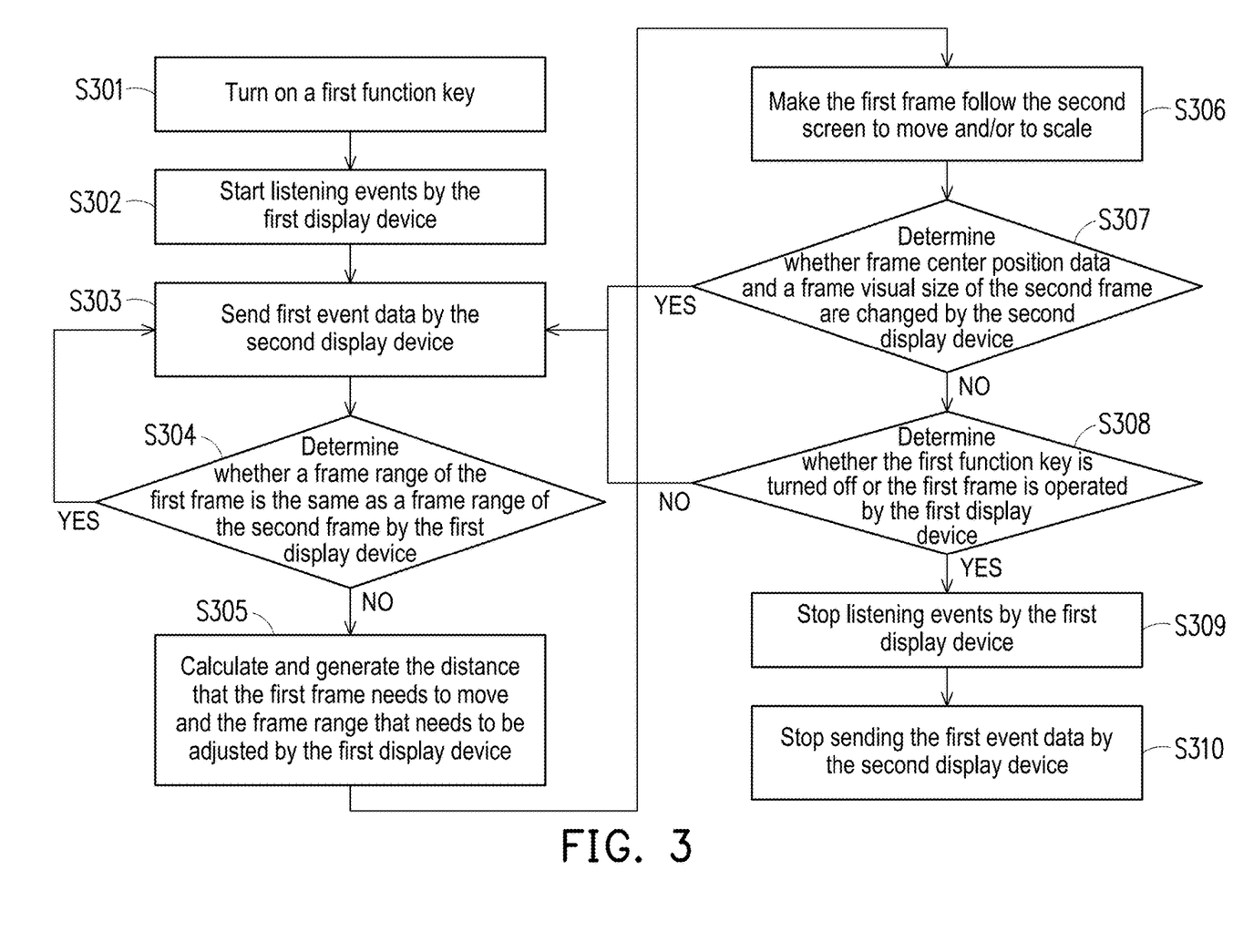
FIG. 3 is a flowchart of frame following according to an embodiment of the disclosure.
Figure 4:
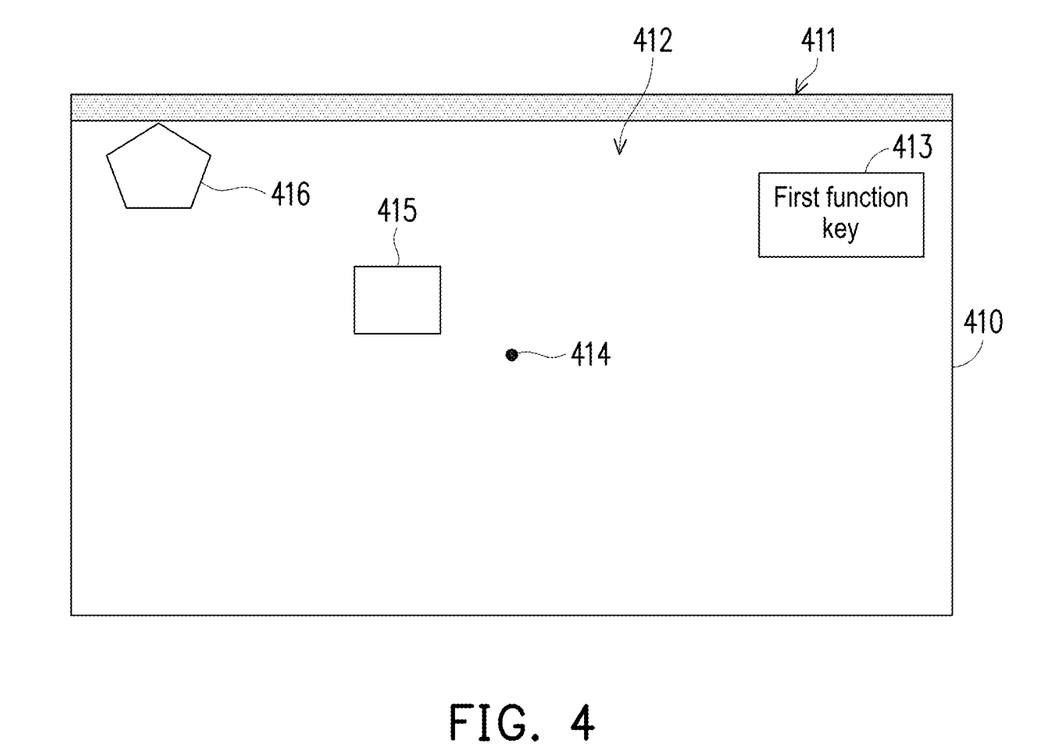
FIG. 4 is a schematic diagram of a first display interface according to an embodiment of the disclosure.
Figure 5:
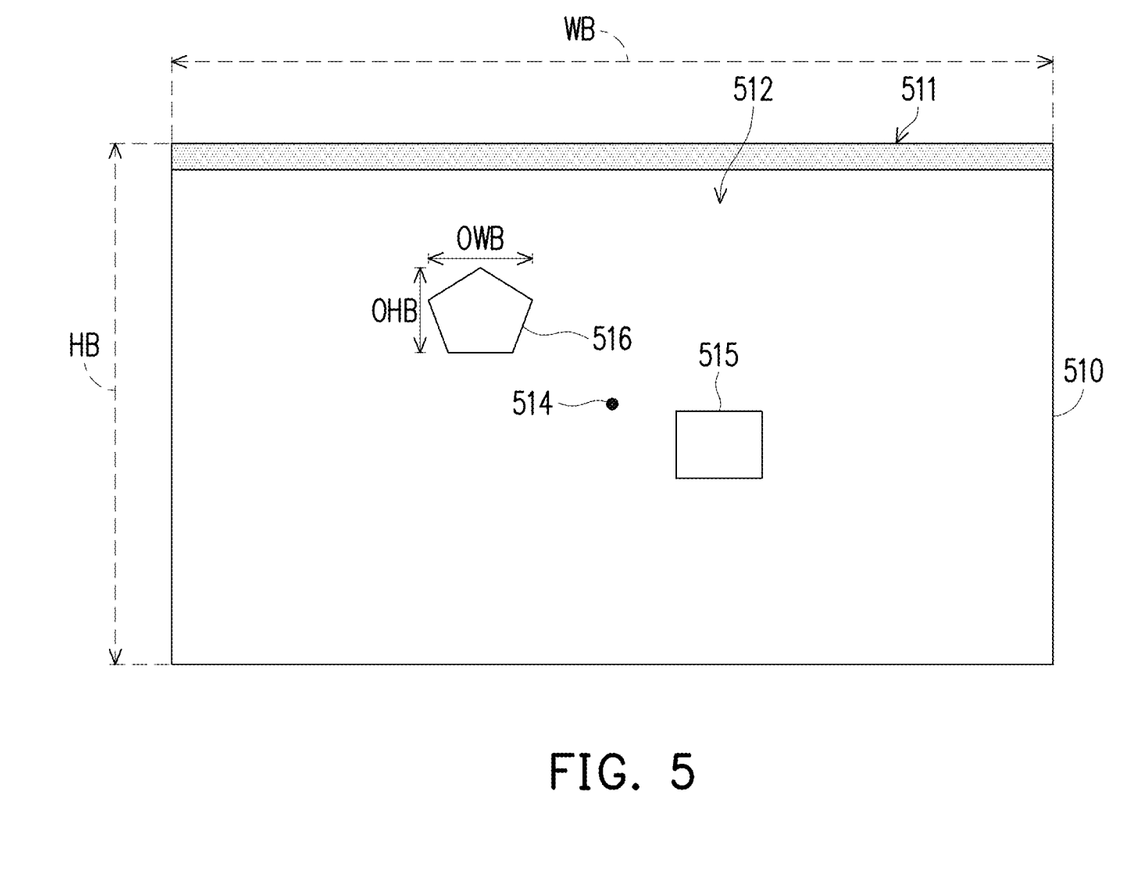
FIG. 5 is a schematic diagram of a second display interface according to an embodiment of the disclosure.

FIG. 3 is a flowchart of frame following according to an embodiment of the disclosure. FIG. 4 is a schematic diagram of a first display interface according to an embodiment of the disclosure. FIG. 5 is a schematic diagram of a second display interface according to an embodiment of the disclosure. Referring to FIG. 1, FIG. 3 to FIG. 5, the collaboration system 100 may perform the following steps S301 to S310 to implement the frame following function. In the embodiment, the first screen 113 of the first display device 110 may display, for example, a first display interface 410 shown in FIG. 4, where the first display interface 410 includes a first display window 411 and a first function key 413 (i.e., a follow key). In an embodiment of the disclosure, a positional relationship between the first display window 411 and the first function key 413 is not limited, and the display content and format of the first display interface are not limited thereto. The first display window 411 is configured to display a first frame 412. The second screen 123 of the second display device 120 may display, for example, a second display interface 510 shown in FIG. 5, where the second display interface 510 includes a second display window 511. However, the display content and format of the second display interface of the disclosure are not limited thereto. The second display window 511 is configured to display a second frame 512.

In the embodiment, the first display window 411 and the second display window 511 may implement writing or drawing functions to display a collaboration frame. The first frame 412 may include pattern objects 415, 416, and the second frame 512 may include pattern objects 515, 516. However, since resolutions and/or screen sizes of the first screen 113 and the second screen 123 are different, or frame center positions 414 and 514 of the collaboration frames respectively displayed on the first screen 113 and the second screen 123 are different, the positions of the pattern objects 415 and 416 in the first frame 412 are different from the positions of the pattern objects 515 and 516 in the second frame 512. In detail, the collaboration frame may be regarded as an infinitely extending canvas that may be written or drawn on. The server 130 allows the first display window 411 and the second display window 511 to jointly display a same collaboration frame, so that the user of the first display device 110 and the user of the second display device 120 may write or draw in the same collaboration frame to achieve good collaboration effect.

In the embodiment, a communication connection (such as a Socket connection) may be created among the first display device 110, the second display device 120 and the server 130. Those skilled in the art may understand that Socket is an intermediate software abstraction layer for communication between an application layer and a TCP/IP protocol, and Socket is an interface. In step S301, the user operating the first display device 110 may press the first function key 413 through, for example, a mouse or a touch panel, so that the first function key 413 is turned on. In step S302, the first processor 111 of the first display device 110 starts listening for events through the first communication device 112. Those skilled in the art may clearly understand that the so-called listening event is a request to receive or listen to the signal sent by the second display device 120. For example, Socket executes a listen function. In step S303, the second processor 121 of the second display device 120 sends the first event data through the second communication device 122. The first event is an operation of making the first frame displayed by the first display device 110 move along with the second frame displayed by the second display device 120. In other words, when the first function key 413 is turned on, the first display device 110 receives the first event data sent by the second display device 120. The first event data may be frame following event data. The first event data may include current frame center position data of the second frame 512 (coordinate information of the frame center position 514 of the second frame (i.e., corresponding to a coordinate point (XB, YB) in the collaboration frame, which is not shown in the figure)) and second frame visual size data (i.e., data of a frame width WB and a frame height HB). In step S304, the first processor 111 may determine whether the frame range of the first frame 412 is the same as the frame range of the second frame 512 according to the first event data, so as to determine to make the first frame 412 move along with the second frame 512, and to make the first frame 412 scale the frame range of the first frame 412 to be consistent with the frame range of the second frame 512.

Specifically, the first processor 111 may determine whether the frame range of the first frame 412 is the same as the frame range of the second frame 512 according to whether a difference between the frame center position 414 of the first frame 412 (i.e., corresponding to a coordinate point (XA, YA) in the collaboration frame) and the frame center position 514 of the second frame 512 (i.e., corresponding to the coordinate point (XB, YB) in the collaboration frame) exceeds a predetermined distance threshold, and according to whether a difference between the frame visual size of the first frame 412 (i.e., a first area obtained by multiplying the frame width and the frame height of the first frame 412) and the frame visual size of the second frame 512 (i.e., a second area obtained by multiplying the frame width and the frame height of the second frame 512) exceeds a predetermined area threshold.

If the frame range of the first frame 412 is the same as the frame range of the second frame 512, step S303 is re-executed to continuously update the current frame center position data and the frame visual size data of the second frame 512. If the frame range of the first frame 412 is not the same as the frame range of the second frame 512, then in step S305, the first processor 111 of the first display device 110 may calculate and generate a distance that the first frame 412 needs to move and a frame range that needs to be adjusted. In step S306, the first processor 111 of the first display device 110 may make the first frame 412 follow the second frame 512 to move and/or to scale.

For example, in the following, for example, the first display device 110 forms a first display interface through a web page to display the first frame 412, and the second display device 120 forms a second display interface by executing a program of the Android system to display the second frame 512. The frame visual size of the first frame 412 is different from the frame visual size of the second frame 512. The first screen 113 may, for example, have a resolution (RWA, RHA) (for example, 1920×1080) and a pixel density dpi A. The second screen 123 may, for example, have a resolution (RWB, RHB) (for example, 3840×2160) and a pixel density dpi B. The frame center position 414 of the first frame 412 corresponds to a coordinate point (xA, yA) (in a unit of px) in the collaboration frame. The frame center position 514 of the second frame 512 corresponds to a coordinate point (xB, yB) (in a unit of dp) in the collaboration frame. The frame visual size (in the unit of dp) of the second frame 512 is (WB, HB), and a size of the pattern object 516 (the pattern object 515 may be deduced by analogy) is (OWB, OHB) (i.e., the object width OWB and the object height OHB) (in the unit of dp). In this regard, the first processor 111 may calculate a scaling ratio SR according to a following equation (1). The first processor 111 may calculate the pixel density difference (dpiRatio) DR according to a following equation (2) and equation (3), where the equation (2) corresponds the frame center position 514 of the second frame 512 to the coordinate point (xB, yB) (in the unit of dp) in the collaboration frame and the unit is converted from dp to px. However, in an embodiment, if the first display device 110 and the second display device 120 run a same system, i.e., if they both run the Android system, there is no need to perform the unit conversion of the following equation (2).

$$SR = \left(\frac{RWA}{RWB}, \frac{RHA}{RHB}\right) \quad \text{equation (1)}$$

$$\begin{cases} xBpx = xB*(dpiA/160) \\ yBpx = yB*(dpiA/160) \end{cases} \quad \text{equation (2)}$$

$$DR = dpiA/dpiB \quad \text{equation (3)}$$

Then, the first processor 111 may move the frame center position 414 of the first frame 412 to a corresponding position (FX, FY) in the collaboration frame according to a following equation (4). The first processor 111 may scale a length and a width (OSW, OSH) of the pattern object 416 (the pattern object 415 may be deduced by analogy) according to a following equation (5). The first processor 111 may scale the frame visual size of the first frame 412 to a corresponding size (SW, SH) according to a following equation (6).

$$\begin{cases} FX = xBpx*DR \\ FY = yBpx*DR \end{cases} \quad \text{equation (4)}$$

$$\begin{cases} OSW = OWB*(dpiA/160)*SR \\ OSH = OHB*(dpiA/160)*SR \end{cases} \quad \text{equation (5)}$$

$$\begin{cases} SW = WB*(dpiA/160)*SR \\ SH = HB*(dpiA/160)*SR \end{cases} \quad \text{equation (6)}$$

The calculation programs of the above equations (1) to (6) may all be stored in the storage unit of the first display device 110 and the storage unit of the second display device 120, and may be executed by the first processor 111 and the second processor 121.

In step S307, the second processor 121 of the second display device 120 may determine whether the frame center position data and the frame visual size of the second frame 512 have changed. If yes, step S303 is re-executed to continuously update the current frame center position data and the frame visual size data of the second frame 512 and provide the same to the first processor 111 of the first display device 110. If not, step S308 is executed, and in step S308, the first processor 111 of the first display device 110 may determine whether the first function key 413 is turned off or the first frame 412 is manually operated by the user of the first display device 110 (as described above, the first frame is operated through a mouse or a touch panel). If not, step S303 is re-executed to continuously provide the current frame center position data and frame visual size data of the second frame 512. If yes, step S309 is executed, and the first processor 111 of the first display device 110 may stop listening event. In step S310, the second display device 120 may stop sending the first event data. It should be noted that in any of the above steps, if the first function key is turned off or the first frame 412 is manually operated by the user, step S309 will be executed to stop listening event, and the second processor 121 of the second display device 120 no longer provides the current frame center position data and frame visual size data of the second frame 512.

Therefore, in the embodiment, when the first function key is turned on, the range and position of the collaboration frame displayed by the first display device 110 may automatically follow the range and position of the collaboration frame displayed by the second display device 120. In addition, in another embodiment, the second display interface 510 may also display a second function key (not shown), and after the user operating the second display device 120 turns on the second function key, the range and position of the collaboration frame displayed by the second display device 120 may automatically follow the range and position of the collaboration frame displayed by the first display device 110.

Figure 6:
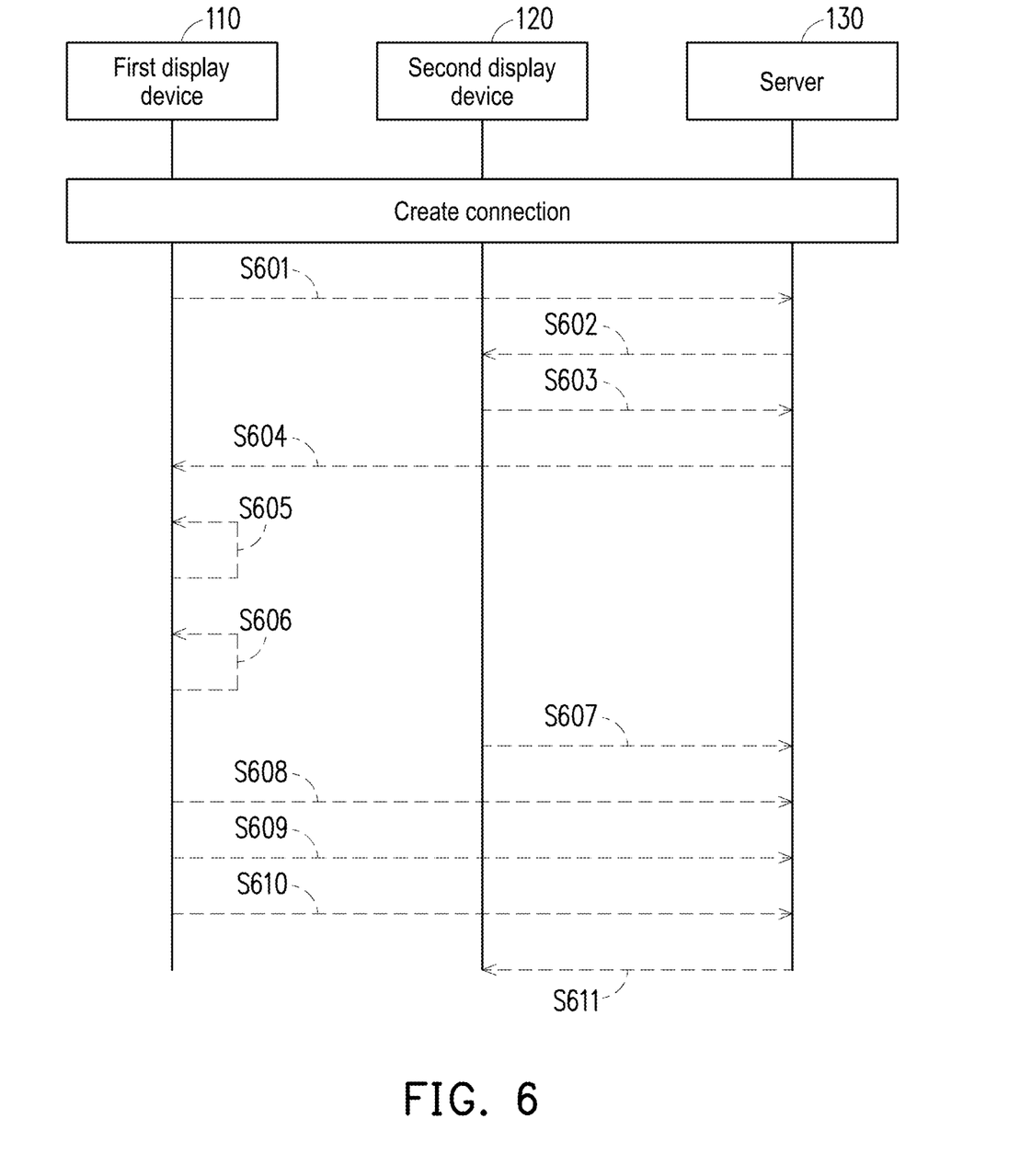
FIG. 6 is a flowchart of a frame following event according to an embodiment of the disclosure.

FIG. 6 is a flowchart of a frame following event according to an embodiment of the disclosure. Referring to FIG. 1 and FIG. 6, the collaboration system 100 may perform the following steps S601-S611 to implement listening for the frame following event. In the embodiment, a Socket connection may be created among the first display device 110, the second display device 120 and the server 130. In step S601, when the first function key of the first display device 110 is turned on, the first processor 111 notifies the server 130 to perform listening for the frame following event. The frame following event is an operation that makes the first frame displayed by the first display device 110 move along with the second frame displayed by the second display device 120. In step S602, the server 130 notifies the second display device 120 that a frame following event currently occurs, i.e., the server 130 requires the second display device 120 to provide frame following event data. In step S603, the second display device 120 may send the frame following event data to the server 130. In step S604, the server 130 sends the frame following event data to the first display device 110. In other words, the second processor 121 may send the frame following event data to the server 130 and send the frame following event data to the first display device 110 through the server 130. There is no direct communication between the first display device 110 and the second display device 120.

In step S605, if the frame range of the first frame displayed by the first screen 113 of the first display device 110 is the same as the frame range of the second frame displayed by the second screen 123 of the second display device 120, then the first display device 110 does not adjust the first frame and continues to receive the frame following event data. On the contrary, in step S606, if the frame range of the first frame is not the same as the frame range of the second frame, the first display device 110 adjusts the first frame, so as to make the first frame move along with the second frame, and to make the first frame scale the frame range to be consistent with the frame range of the second frame. In step S607, if the user operating the second display device 120 drags the second frame/or changes the visual size thereof, the frame following event data is updated and sent to the server 130. In step S608, the server 130 sends the new frame following event data to the first display device 110. In step S609, when the first function key is turned off or the first frame is manually operated by the user, the first processor 111 notifies the server 130 to stop sending the frame following event data. In step S610, the first processor 111 notifies the server 130 to stop listening for the frame following event. In step S611, the server 130 notifies the second display device 120 to stop sending the frame following event data.

Figure 7:
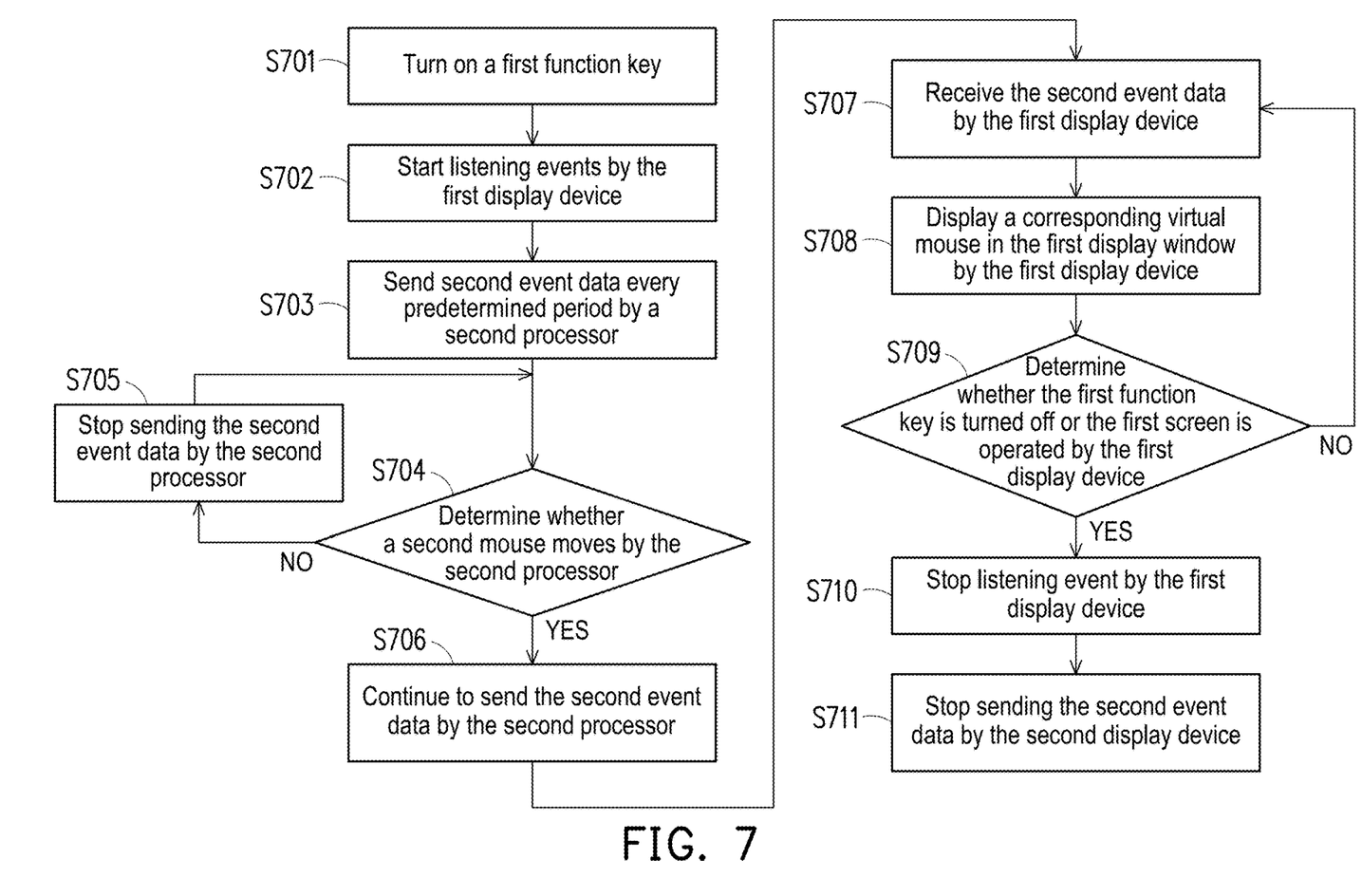
FIG. 7 is a flowchart of mouse following according to an embodiment of the disclosure.

FIG. 7 is a flowchart of mouse following according to an embodiment of the disclosure. Referring to FIG. 1 and FIG. 7, the collaboration system 100 may further perform the following steps S701 to S711 to implement the frame following function. In the embodiment, the Socket connection may be created among the first display device 110, the second display device 120 and the server 130. In the embodiment, the first display device 110 may further display a first mouse in the first frame, and the second display device 120 may further display a second mouse in the second frame. In addition, the same collaboration frame is displayed in the first frame and the second frame. In step S701, the user operating the first display device 110 may press the first function key through, for example, a mouse or a touch panel, so that the first function key is turned on. In step S702, the first processor 111 of the first display device 110 starts listening events through the first communication device 112. In step S703, the second processor 121 of the second display device 120 sends second event data through the second communication device 122. The second event is an operation of making a virtual mouse displayed on the first display device 110 move along with the second mouse displayed on the second display device 120. In other words, when the first function key 413 is turned on, the first display device 110 receives the second event data sent by the second display device 120. The second event data may be mouse following event data. The second event data may include position data of the second mouse, i.e., a coordinate value of the position of the second mouse. In step S704, the second processor 121 may determine whether the second mouse moves every a predetermined period. The predetermined period is, for example, 0.5 seconds, but the disclosure is not limited thereto. If not, in step S705, the second processor 121 may stop sending the second event data, and re-execute step S704 after the predetermined period, thus reducing the amount of data sent. If yes, in step S706, the second processor 121 may continue to send the second event data.

In step S707, the first display device 110 may receive the second event data. In step S708, the first display device 110 may display a virtual mouse corresponding to the second mouse in the first display window according to the second event data. From another perspective, when the first function key of the first display device 110 is turned on, the virtual mouse displayed in the first display window by the first display device 110 moves along with the second mouse displayed in the second display window by the second display device 120. Moreover, in an embodiment, the second processor 121 may, for example, update position data of the second mouse every 0.5 seconds (i.e., update the second event data every 0.5 seconds). Therefore, the first processor 111 of the first display device 110 may further use a canvas element of a hyper text markup language (HTML) to draw a movement path of the virtual mouse to effectively reduce a pause feeling.

In step S709, the first processor 111 of the first display device 110 may determine whether the first function key is turned off or the first screen is manually operated by the user (as explained above, the first frame is operated through a mouse or a touch panel). If not, step S707 is re-executed to continue allowing the first display device 110 to receive the second event data. If yes, in step S710, the first processor 111 of the first display device 110 may stop listening event. In step S711, the second display device 120 may stop continuing to send the second event data.

Therefore, in the embodiment, when the first function key is turned on, the virtual mouse in the collaboration frame displayed by the first display device 110 may automatically follow the second mouse in the collaboration frame displayed by the second display device 120 to move, and the first mouse of the first display device 110 does not follow the second mouse of the second display device 120 to move. The movement of the first mouse of the first display device 110 is controlled by the user using the first display device 110. In addition, in an embodiment, the frame following function and the mouse following function may also be triggered through different function keys of the first display device 110 or the second display device 120 other than being limited by the above-mentioned first function key.

Figure 8:
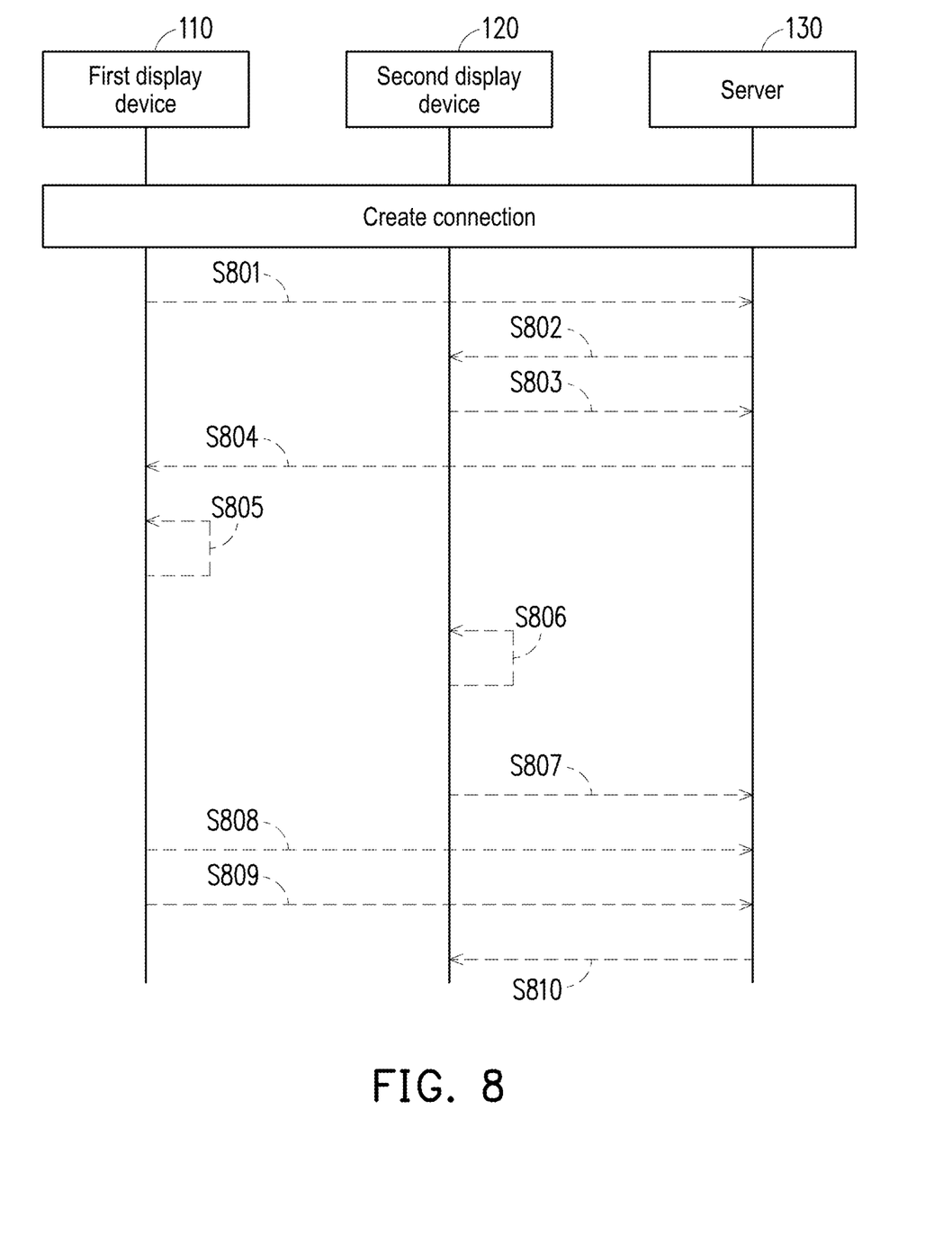
FIG. 8 is a flowchart of a mouse following event according to an embodiment of the disclosure.

FIG. 8 is a flowchart of a mouse following event according to an embodiment of the disclosure. Referring to FIG. 1, FIG. 7 and FIG. 8, the collaboration system 100 may perform the following steps S801 to S810 to implement the mouse following function. In the embodiment, the Socket connection may be created among the first display device 110, the second display device 120 and the server 130. In step S801, when the first function key of the first display device 110 is turned on, the first processor 111 notifies the server 130 to perform listening for the mouse following event. The mouse following event is an operation that makes the virtual mouse displayed on the first display device 110 move along with the second mouse displayed on the second display device 120. In step S802, the server 130 notifies the second display device 120 that a mouse following event currently occurs, i.e., the server 130 requires the second display device 120 to provide mouse following event data. In step S803, the second display device 120 may send the mouse following event data to the server 130. In step S804, the server 130 sends the mouse following event data to the first display device 110. In other words, the second processor 121 may send the mouse following event data to the server 130 and send the mouse following event data to the first display device 110 through the server 130. There is no direct communication between the first display device 110 and the second display device 120.

In step S805, the first display device 110 may display a virtual mouse corresponding to the second mouse in the first display window according to the position data of the second mouse in the mouse following event data. In step S806, if the second display device 120 determines that the second mouse does not move, the second display device 120 stops sending the mouse following event data to the server 130 to reduce the amount of transmitted data. On the contrary, in step S807, if the second display device 120 determines that the second mouse is moved, the second display device 120 continuously updates the mouse following event data to the server 130. In step S808, when the first function key is turned off or the first frame is manually operated by the user, the first processor 111 notifies the server 130 to stop sending the position data of the second mouse, so that the virtual mouse may be cancelled (i.e., to stop following the second mouse). In step S809, the first processor 111 notifies the server 130 to stop listening for the mouse follow event. In step S810, the server 130 notifies the second display device 120 to stop sending the mouse follow event data.

In summary, in the collaboration system and collaboration method of the disclosure, when the function key for executing the frame following function and/or the mouse following function is turned on, the frame and/or the mouse displayed by the first display device may move along with the frame and/or the mouse displayed by the second display device, so as to achieve an electronic whiteboard function with good collaboration effect and user experience. Namely, through the technical means of the collaboration system and collaboration method of the disclosure, the technical problem that may be solved is that when multiple display devices with different resolutions are used in collaboration, when the user moves the frame or performs operations such as zooming in or out, other participants will not be able to see the same range of the frame.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A collaboration system, comprising:
a first display device, comprising:
a first communication device, configured to wirelessly connect with internet; and
a first screen, configured to display a first display interface, wherein the first display interface comprises a first display window and a first function key, and the first display window is configured to display a first frame; and
a second display device, comprising:
a second communication device, configured to wirelessly connect with the internet; and
a second screen, configured to display a second display interface, wherein the second display interface comprises a second display window, and the second display window is configured to display a second frame,
wherein in response to the first function key being turned on, the first frame displayed on the first display window moves along with the second frame displayed on the second display window,
wherein in response to the first function key being turned off, the first frame displayed on the first display window does not follow movement of the second frame displayed on the second display window.

2. The collaboration system as claimed in claim 1, wherein the first display device further comprises:

a first processor, electrically connected to the first communication device and the first screen, and configured to receive first event data sent by the second display device in response to the first function key being turned on,
wherein the first processor is configured to determine whether a frame range of the first frame is the same as a frame range of the second frame according to the first event data, so as to determine to make the first frame move along with the second frame, and to make the first frame scale the frame range of the first frame to be consistent with the frame range of the second frame.

3. The collaboration system as claimed in claim 2, wherein the first processor is configured to determine whether the frame range of the first frame is the same as the frame range of the second frame according to whether a difference between a frame center position of the first frame and a frame center position of the second frame exceeds a predetermined distance threshold, and according to whether a difference between a frame visual size of the first frame and a frame visual size of the second frame exceeds a predetermined area threshold.

4. The collaboration system as claimed in claim 2, wherein in response to the first processor determining that the frame range of the first frame is not the same as the frame range of the second frame, the first processor is configured to calculate and generate a distance that needs to move and a frame range that needs to be adjusted for the first frame.

5. The collaboration system as claimed in claim 2, further comprising:
a server, communicatively connected to the first display device and the second display device,
wherein in response to the first function key being turned on, the first processor is configured to notify the server to obtain the first event data.

6. The collaboration system as claimed in claim 5, wherein the second display device further comprises:
a second processor, electrically connected to the second communication device and the second screen, and configured to send the first event data to the server, so as to send the first event data to the first display device through the server.

7. The collaboration system as claimed in claim 6, wherein the first event data comprises frame center position data and frame visual size data of the second frame.

8. The collaboration system as claimed in claim 6, wherein in response to the first function key being turned on, a virtual mouse in the first display window moves along with a second mouse in the second display window.

9. The collaboration system as claimed in claim 8, wherein in response to the first function key being turned on, the second processor is configured to determine whether the second mouse moves every predetermined period to send second event data to the server, so as to send the second event data to the first display device through the server.

10. The collaboration system as claimed in claim 9, wherein the second event data comprises position data of the second mouse, and the first processor displays the virtual mouse corresponding to the second mouse in the first display window according to the position data of the second mouse.

11. A collaboration method, comprising:
displaying a first display interface through a first screen of a first display device, wherein the first display interface comprises a first display window and a first function key, and the first display window is configured to display a first frame;

displaying a second display interface through a second screen of a second display device, wherein the second display interface comprises a second display window, and the second display window is configured to display a second frame;

in response to the first function key being turned on, making the first frame displayed on the first display window move along with the second frame displayed on the second display window; and in response to the first function key being turned off, making the first frame displayed on the first display window not follow movement of the second frame displayed on the second display window.

12. The collaboration method as claimed in claim 11, wherein making the first frame displayed on the first display window move along with the second frame displayed on the second display window comprises:

receiving first event data sent by the second display device through the first display device in response to the first function key being turned on; and determining whether a frame range of the first frame is the same as a frame range of the second frame by the first display device according to the first event data, so as to determine to make the first frame move along with the second frame, and to make the first frame scale the frame range of the first frame to be consistent with the frame range of the second frame.

13. The collaboration method as claimed in claim 12, wherein determining whether the frame range of the first frame is the same as the frame range of the second frame comprises:

determining whether the frame range of the first frame is the same as the frame range of the second frame by the first display device according to whether a difference between a frame center position of the first frame and a frame center position of the second frame exceeds a predetermined distance threshold, and according to whether a difference between a frame visual size of the first frame and a frame visual size of the second frame exceeds a predetermined area threshold.

14. The collaboration method as claimed in claim 12, wherein making the first frame move along with the second frame, and making the first frame to scale the frame range of the first frame to be consistent with the frame range of the second frame comprises:

in response to the first display device determining that the frame range of the first frame is not the same as the frame range of the second frame, calculating and generating a distance that needs to move and a frame range that needs to be adjusted for the first frame by the first display device.

15. The collaboration method as claimed in claim 12, further comprising:

in response to the first function key being turned on, notifying a server by the first display device to obtain the first event data.

16. The collaboration method as claimed in claim 15, further comprising:

sending the first event data to the server by the second display device, so as to send the first event data to the first display device through the server.

17. The collaboration method as claimed in claim 16, wherein the first event data comprises frame center position data and frame visual size data of the second frame.

18. The collaboration method as claimed in claim 16, further comprising:

in response to the first function key being turned on, making a virtual mouse in the first display window move along with a second mouse in the second display window.

19. The collaboration method as claimed in claim 18, wherein making the virtual mouse in the first display window move along with the second mouse in the second display window comprises:

in response to the first function key being turned on, determining whether the second mouse moves every predetermined period by the second display device to send second event data to the server, so as to send the second event data to the first display device through the server.

20. The collaboration method as claimed in claim 19, wherein the second event data comprises position data of the second mouse, and making the virtual mouse in the first display window move along with the second mouse in the second display window further comprises:

displaying the virtual mouse corresponding to the second mouse in the first display window by the first display device according to the position data of the second mouse.

* * * * *